(12) United States Patent
Fein et al.

(10) Patent No.: US 8,604,928 B2
(45) Date of Patent: *Dec. 10, 2013

(54) RFID IONOSPHERE

(75) Inventors: Gene Fein, Lenox, MA (US); Edward Merritt, Lenox, MA (US)

(73) Assignee: National Networks Limited LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/527,410

(22) Filed: Jun. 19, 2012

(65) Prior Publication Data

US 2012/0259731 A1 Oct. 11, 2012

Related U.S. Application Data

(60) Division of application No. 12/495,672, filed on Jun. 30, 2009, now Pat. No. 8,223,018, which is a continuation of application No. 11/428,209, filed on Jun. 30, 2006, now Pat. No. 7,570,167.

(51) Int. Cl.
*G08B 13/14* (2006.01)

(52) U.S. Cl.
USPC ............ 340/572.1; 340/539.1; 340/539.11; 340/5.61; 340/5.91; 235/383; 235/385; 705/1; 705/10; 705/21

(58) Field of Classification Search
USPC .......... 340/572.1, 572.4, 539.1, 539.11, 5.61, 340/5.91; 235/375, 376, 383, 385; 705/1, 705/10, 21, 26
See application file for complete search history.

(56) References Cited

U.S. PATENT DOCUMENTS

| | | |
|---|---|---|
| 4,138,058 A | 2/1979 | Atalla |
| 4,682,368 A | 7/1987 | Takahashi |
| 4,879,747 A | 11/1989 | Leighton et al. |
| 4,885,778 A | 12/1989 | Weiss |
| 6,084,967 A | 7/2000 | Kennedy et al. |
| 6,263,064 B1 | 7/2001 | O'Neal et al. |
| 6,428,449 B1 | 8/2002 | Apseloff |
| 6,629,077 B1 | 9/2003 | Arling et al. |
| 6,664,897 B2 | 12/2003 | Pape et al. |
| 6,765,470 B2 | 7/2004 | Shinzaki |
| 6,979,264 B2 | 12/2005 | Chatigny |
| 7,097,098 B2 | 8/2006 | Roberts |
| 7,158,776 B1 | 1/2007 | Estes et al. |
| 7,165,722 B2 | 1/2007 | Shafer et al. |
| 7,227,566 B2 | 6/2007 | Abe et al. |
| 7,290,287 B2 | 10/2007 | Rodriguez et al. |
| 7,536,304 B2 | 5/2009 | Di Mambro et al. |

(Continued)

FOREIGN PATENT DOCUMENTS

| | | |
|---|---|---|
| WO | 2006031255 | 3/2006 |
| WO | 2008089107 | 7/2008 |

OTHER PUBLICATIONS

Stolowitz Ford Cowger LLP, "Listing of Related Cases", Jun. 19, 2012, 2 pages.

(Continued)

*Primary Examiner* — Hung T. Nguyen
(74) *Attorney, Agent, or Firm* — Stolowitz Ford Cowger LLP

(57) ABSTRACT

A method, system, and apparatus are disclosed wherein an RFID transponder response signal is coupled with a data file as an identifier. The RFID transponder response signal is used in its raw, or a digitized version of its raw, state.

20 Claims, 18 Drawing Sheets

(56) References Cited

U.S. PATENT DOCUMENTS

| | | |
|---|---|---|
| 7,570,167 B2 | 8/2009 | Fein et al. |
| 7,668,754 B1* | 2/2010 | Bridgelall .................... 705/26.9 |
| 7,769,221 B1 | 8/2010 | Shakes et al. |
| 7,805,614 B2 | 9/2010 | Aull et al. |
| 2001/0052013 A1 | 12/2001 | Munguia et al. |
| 2002/0069166 A1* | 6/2002 | Moreau et al. .................. 705/40 |
| 2002/0077937 A1* | 6/2002 | Lyons et al. .................... 705/28 |
| 2003/0095032 A1 | 5/2003 | Hoshino et al. |
| 2003/0120416 A1 | 6/2003 | Beggs et al. |
| 2003/0149662 A1 | 8/2003 | Shore |
| 2003/0163423 A1 | 8/2003 | Holst-Ronness |
| 2004/0101112 A1 | 5/2004 | Kuo |
| 2004/0162739 A1 | 8/2004 | Lax |
| 2004/0199424 A1 | 10/2004 | Scott et al. |
| 2005/0149391 A1 | 7/2005 | O'Shea et al. |
| 2005/0218215 A1 | 10/2005 | Lauden |
| 2005/0239511 A1 | 10/2005 | Boillot et al. |
| 2005/0276728 A1 | 12/2005 | Muller-Cohn et al. |
| 2006/0046842 A1 | 3/2006 | Mattice |
| 2006/0102717 A1 | 5/2006 | Wood et al. |
| 2006/0208070 A1 | 9/2006 | Kato et al. |
| 2006/0258397 A1* | 11/2006 | Kaplan et al. ............... 455/556.1 |
| 2007/0009139 A1 | 1/2007 | Landschaft et al. |
| 2007/0079012 A1* | 4/2007 | Walker .......................... 709/249 |
| 2008/0118042 A1 | 5/2008 | Hogg |
| 2008/0129507 A1 | 6/2008 | Doan et al. |
| 2008/0169903 A1 | 7/2008 | Fein et al. |
| 2008/0191878 A1* | 8/2008 | Abraham .................... 340/572.1 |
| 2008/0238613 A1 | 10/2008 | Calcagno |
| 2009/0219135 A1 | 9/2009 | Harvey et al. |
| 2009/0276326 A1 | 11/2009 | Fein et al. |
| 2010/0199334 A1 | 8/2010 | Ehrensvard et al. |

OTHER PUBLICATIONS

European Patent Office, International Search Report for PCT/US2008/050934, Jun. 3, 2008, 4 pages.

Haedong Lee et al., "A Study of RFID Privacy Mechanism Using Mobile Phone", World Academy of Science, Engineering and Technology, Oct. 2005, p. 75-78.

* cited by examiner

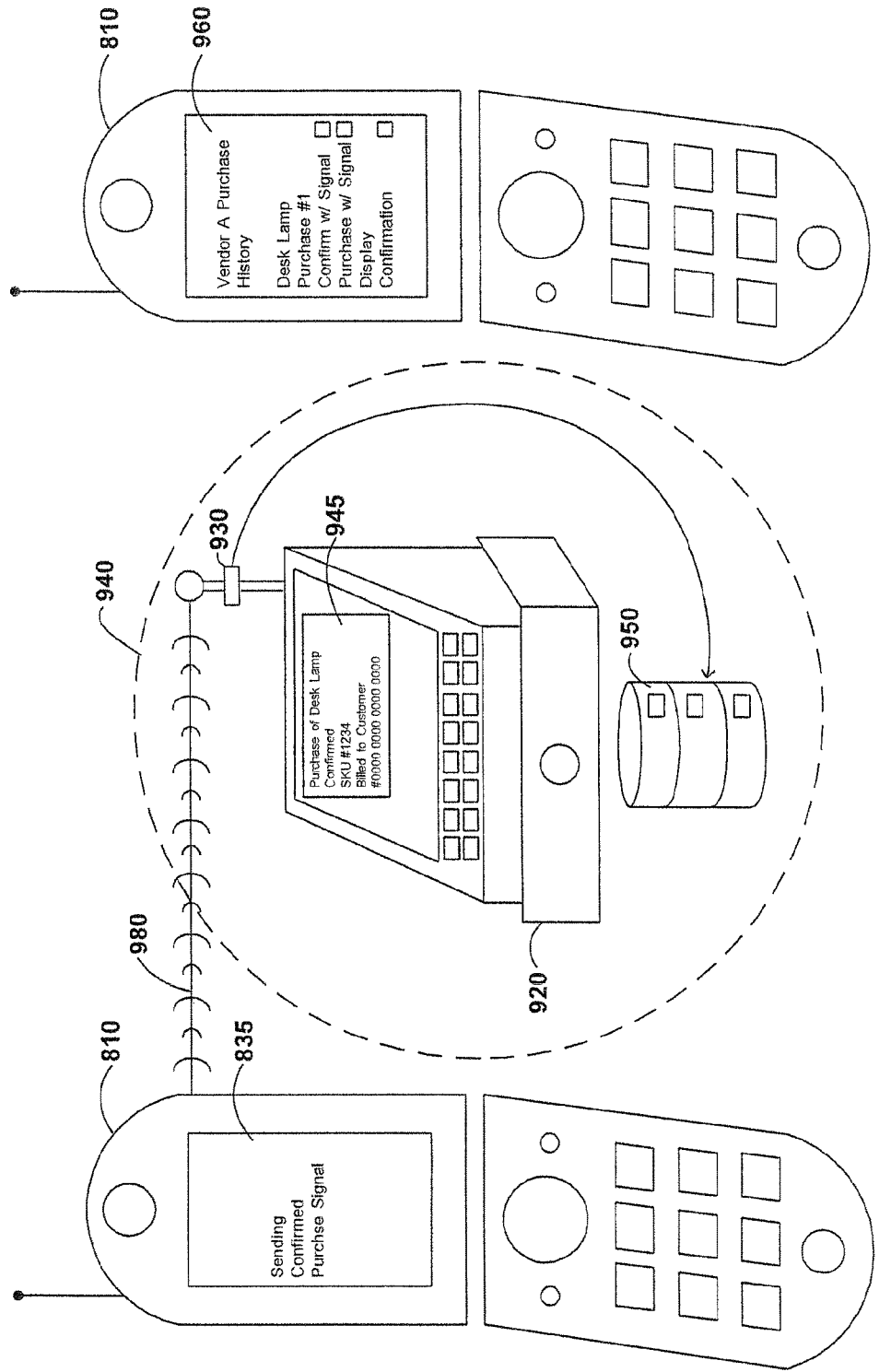

RFID IONOSPHERE

RELATED APPLICATIONS

This application is a divisional of, and claims priority to, pending U.S. patent application Ser. No. 12/495,672, filed Jun. 30, 2009, now U.S. Pat. No. 8,223,018, issued Jul. 17, 2012, which is a continuation of, and claims priority to, U.S. patent application Ser. No. 11/428,209, filed Jun. 30, 2006, now U.S. Pat. No. 7,570,167, issued Aug. 4, 2009, the specifications of which are herein incorporated by reference in their entirety.

BACKGROUND

This disclosure generally relates to Radio Frequency Identification.

Radio Frequency Identification ("RFID") may be used to identify, track, and locate—animals, people and assets. Fundamentally, an RFID system comprises an RFID tag signature device reader ("Reader") and an RFID tag signature device. These are also referred to by role as an interrogator and a transponder, respectively. A Reader may provide functionality beyond that of just reading an RFID tag signature device. A Reader may transfer data, i.e. write, to an RFID tag signature device as well as source the energy necessary to power an RFID tag signature device. When an RFID tag signature device is interrogated by a Reader it may return an analog signal conveying an identification sequence and/or other data.

There currently exist many different, often proprietary, RFID components, systems, interfaces, and protocols. Standardization and interoperability are believed necessary to enable wider adoption of this technology.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and advantages thereof, may best be understood by reference to the following detailed description if read with the accompanying drawings in which:

DETAILED DESCRIPTION

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, and components have not been described in detail so as not to obscure the claimed subject matter.

Unless specifically stated otherwise, as apparent from the following discussion, it is appreciated that throughout this specification a computing platform is a device such as a computer or a similar electronic computing device, that manipulates and/or transforms data represented as physical, electronic and/or magnetic quantities and/or other physical quantities within the computing platform's processors, memories, registers, and/or other information storage, transmission, reception and/or display devices. Accordingly, a computing platform refers to a system or a device that includes the ability to process and/or store data in the form of signals. Thus, a computing platform, in this context, may comprise hardware, software, firmware and/or any combination thereof. Where it is described that a user instruct a computing platform to perform a certain action it is understood that instruct may mean to direct or cause to perform a task as a result of a selection or action by a user. A user may, for example, may instruct a computing platform to embark upon a course of action by signifying a selection by pushing a key, clicking a mouse, maneuvering a pointer, touching a touch screen, and/or by spoken word.

Figure 1:
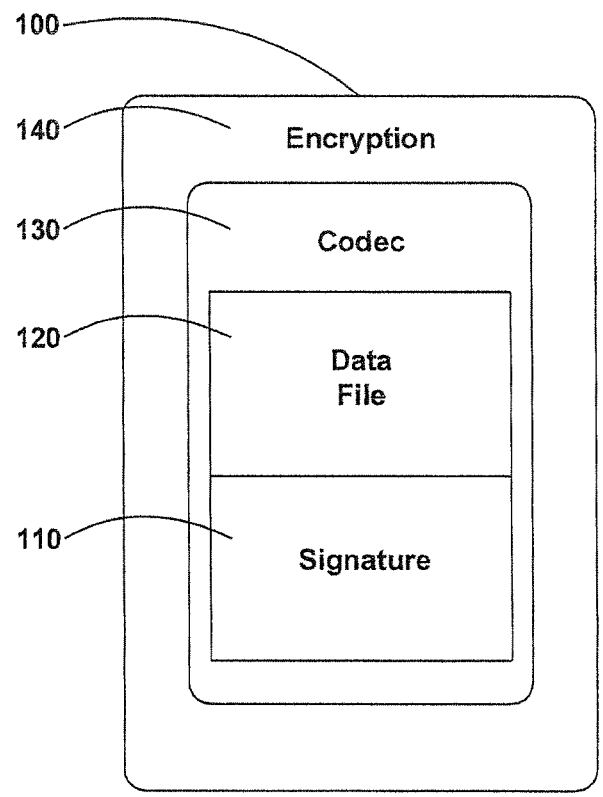
FIG. 1 is block diagram depicting an embodiment of a Composite.

FIG. 1 is a block diagram depicting an embodiment of an RFID tag signature-data file composite ("Composite"). Composite 100 may be created by operationally coupling an RFID tag signature with one or more computer files and/or computer file components. Operationally coupling files may be accomplished where files that are logically or otherwise linked, joined, referenced, and/or utilized together. The process of operationally coupling files may produce operationally coupled files. A portion of a Composite may comprise an RFID tag signature ("Signature"). A Signature 110 may also be commonly referred to as an RFID transponder response, RFID response signal, RFID answer, RFID music file, or RFID tone to name some, though not all, common descriptors. A Signature 110 may be a duplicate or serviceable approximation of a signal returned by an RFID tag signature device in response to an interrogatory signal from a Reader or command from some other computing platform for the RFID tag signature device to identify itself. A Signature may be an electromagnetic signal. A Reader comprises any computing platform capable of functioning as a Reader and/or an RFID Reader/Writer. Signature 110 may for example be captured, saved, created, emulated, emitted, transmitted, employed, implemented, and/or utilized as an analog signal; or as a digitized approximation of an analog or time varying signal.

Composite 100 is comprised of Signature 110 and one or more data files. Data file 120 may, by way of non-limiting example, be comprised of office automation related data, e-commerce related data, and/or media related data. Office automation related data includes for example, but is not limited to, data associated with, and/or providing support for, and/or conveying the content of, a word processing, spreadsheet, database, presentation, and/or data entry computer application. E-commerce related data includes for example, but is not limited to, data associated with, and/or providing support for, and/or conveying the content of, financial transactions as well as forms data such as purchase and sales orders, for example. Examples of such data include purchase data which may be data related to a commercial purchase transaction and sale data which may be data related to a commercial purchase transaction. Media related data includes for example, but is not limited to, data associated with, and/or providing support for, and/or conveying the content of, image, sound, and multi-media. Any of the above listed examples of data file may overlap others and is not intended to be exclusive. Further, multiple instances of data file 120 may occur within or be associated with Composite 100. Any data described above as a "related" of data includes, but is not limited to, data specifically associated with the above-described data but also the related components utilized to implement their creation, transfer, and use. Composite 100 may also comprise codec 130 and encryption 140. Any of the above described types of related data may comprise a data file of that type. For example, an office automation related file may be comprised of office automation related data.

Figure 2:
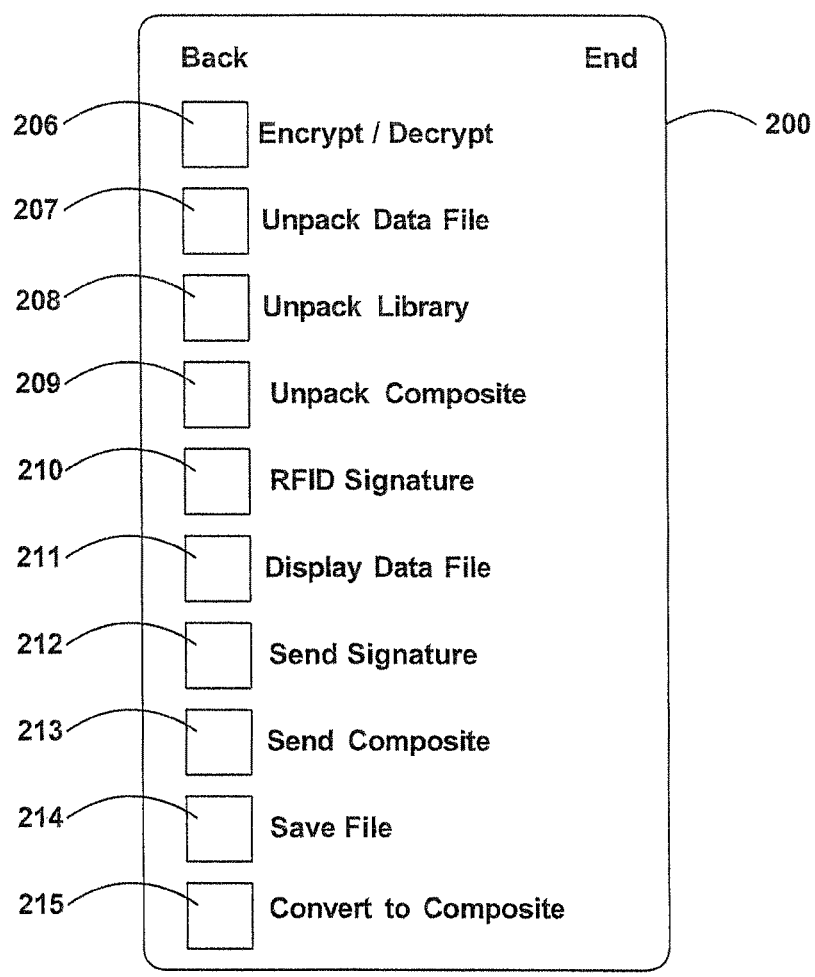
FIG. 2 depicts an embodiment of a user screen displaying some actions possible through a software application utilizing a Composite.

FIG. 2 depicts an embodiment of a user display, such as a user screen 200, displaying some functions available through a software application implementing a Composite. Such user screen may be implemented on any device capable of functioning as and/or supporting a Reader. Encryption and decryption functions 206 are suitable for use with sensitive files such as those containing financial and/or personal information. Solutions providing such encryption/decryption functionality may, for example, be open source or proprietary. A data file may be unpacked 207 from a Composite. Libraries comprising Composites may similarly be unpacked 208. A Signature may be unpacked 209 from a Composite. Signatures may be listed 210 by the software application. Data file contents may be displayed by selecting a Display Data File function 211. From user display 200 a Signature may be sent 212 to a Reader, an RFID tag signature device, and/or any other computing platform. Another function may send an entire Composite 213 to another computing platform for immediate or later use. An existing Composite may also be saved 214. Lastly, in this embodiment, user display 200 presents the option to combine a data file and a Signature together 215 into a Composite.

Figure 3:
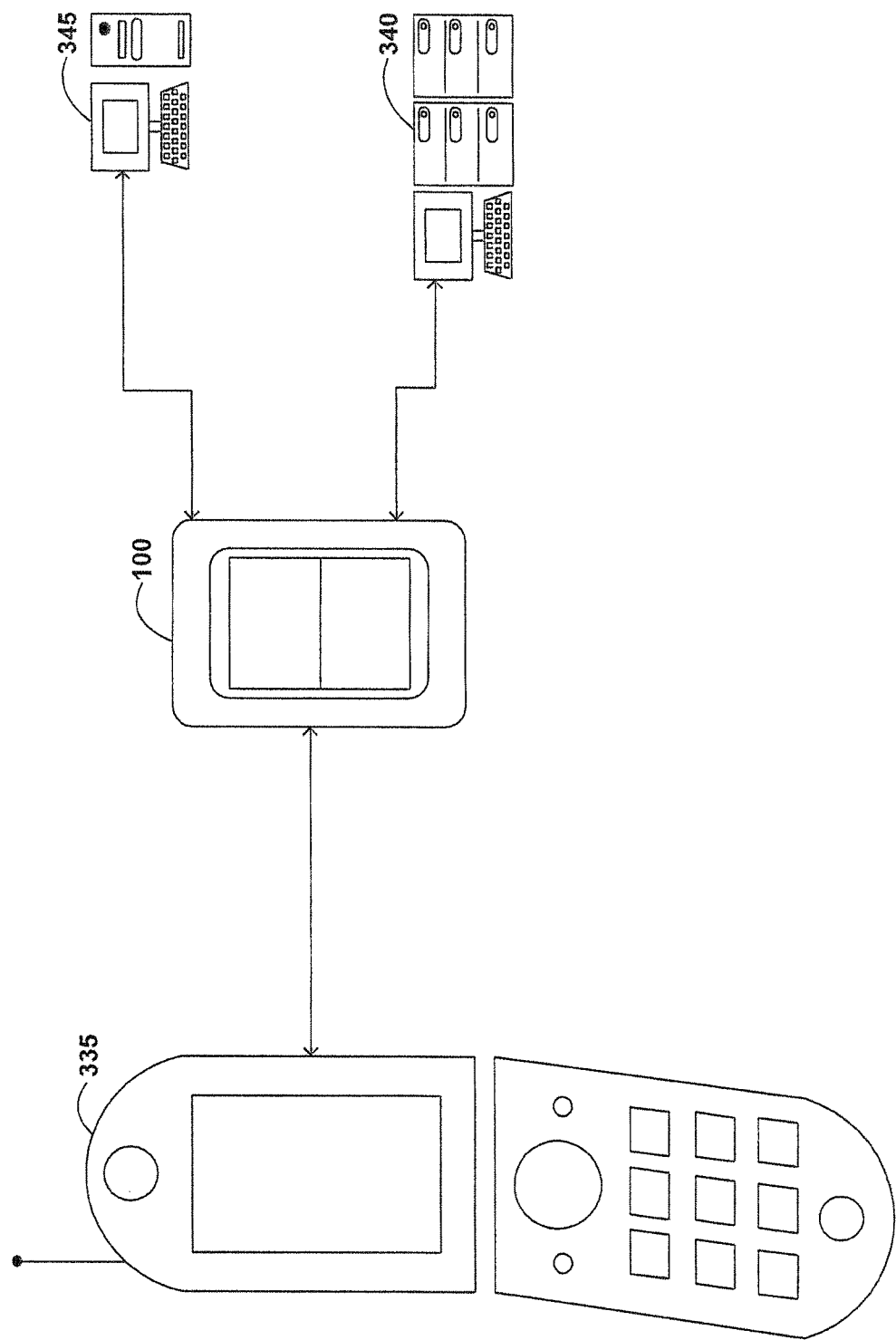
FIG. 3 is a block diagram depicting an embodiment of a Composite in a networked environment.

FIG. 3 is a block diagram depicting an embodiment of a Composite in a networked environment. More specifically, this embodiment illustrates a way a Composite may be exchanged. Composite 100 may first be created by outside file origination source 345, a computing platform, and transmitted to server 340 via download or email for example. Composite 100 may then be sent from server 340 to a third party device such as a Reader, depicted here as cell phone 335. Cell phone 335 may have installed on it a software application adapted to process a Composite. Such software application may be tailored to particular operating systems and/or devices. Alternatively, outside file origination source 345 may transmit Composite 100 directly to computing platform 335. Similarly, computing platform 335 may originate or modify Composite 100 and transmit it to server 340 and/or outside file origination source 345.

Figure 4:
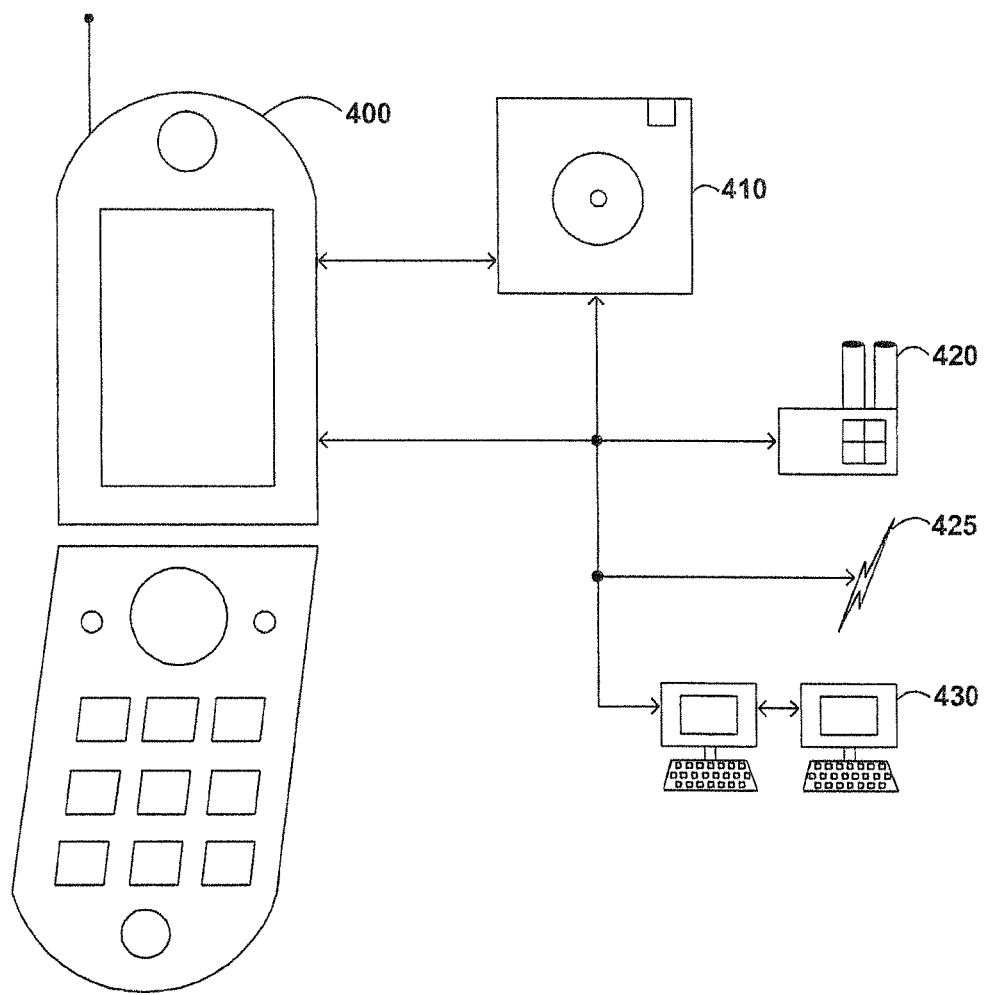
FIG. 4 is a block diagram depicting installation of an embodiment of a computer software application adapted to process Composites.

FIG. 4 is a block diagram depicting installation of an embodiment of a computer software application suitable for operation with a Composite. A computing platform such as cell phone 400 may have installed within it software application 410 adapted to process a Composite. If software application 410 is installed while cell phone 400 is still at factory 420 the manufacturer may avail itself of several advantages. These advantages include, but are not limited to, the ability to load a large number of similar computing platforms with a tested version of the software application and quality assurance testing of the completed computing platforms. Similarly, software application 410 may be installed via download 425 or by synchronizing it with computing platform 430.

Figure 5:
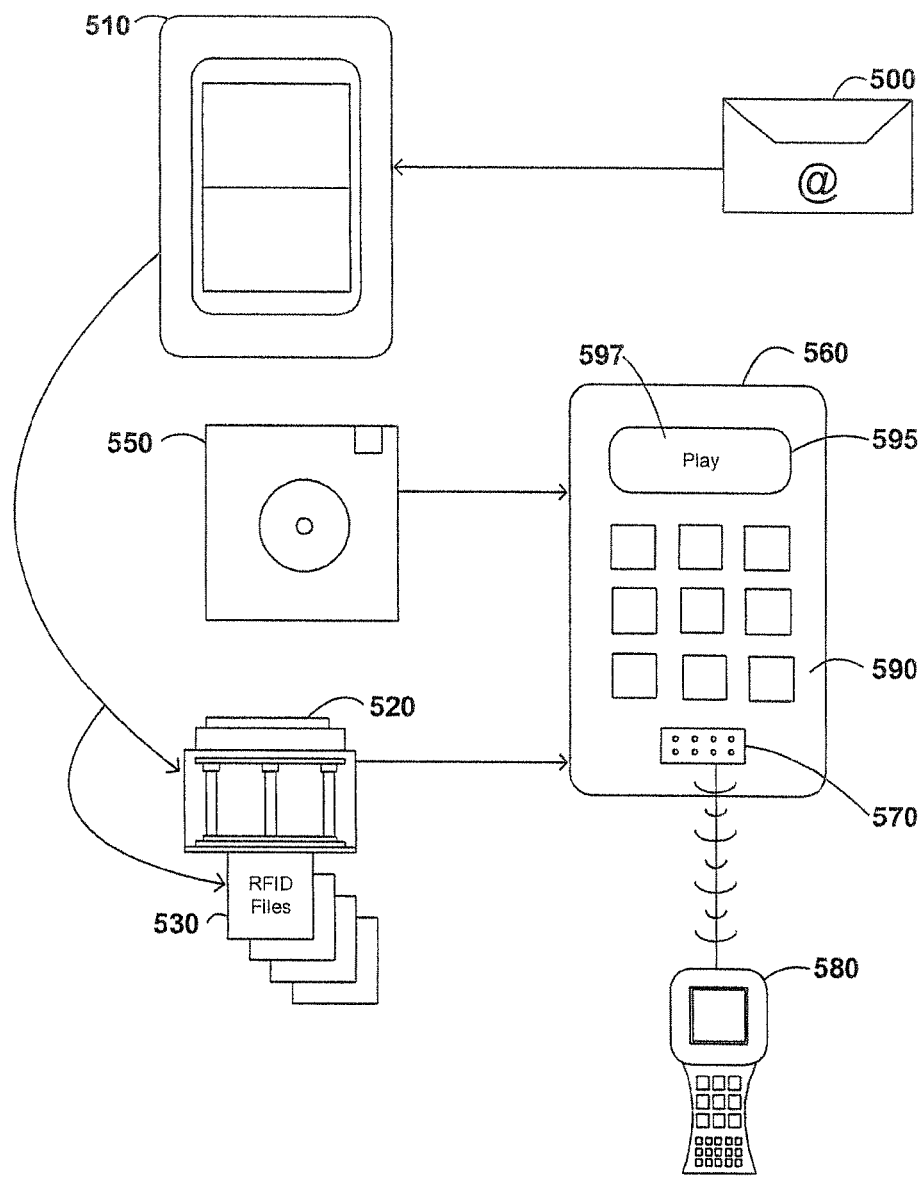
FIG. 5 is a block diagram of an embodiment showing transmission as an email attachment, subsequent storage, and user utilization of a Composite.

FIG. 5 is a block diagram of an embodiment illustrating transmission of a Composite as an email attachment, and the subsequent storage, then user utilization of the Composite. Email 500 may be transmitted having Composite 510 as an attachment. Computing platform 590, shown here by way of non-limiting example as a PDA, may be capable of processing Composite 510 because it is loaded with software application 550 in a storage medium such as memory 560. Computing platform 590 may receive and store email 500 with Composite 510 as an attachment. Memory 560 may be a storage medium comprised of volatile or non-volatile memory. Composite 510 may be stored as part of library 520. Alternatively, Composite 510 may be stored individually or with other files in folders 530. User options may be displayed on user screen 595. If a user initiates "Play Signature" 597 computing platform 590 may transmit the selected Signature through a play assembly such as emitter 570 for example. The output of emitter 570 may be received by a capture assembly such as Reader 580 for example or any other computing platform. Reader 580 may then initiate a subsequent action if appropriate.

Figure 6:
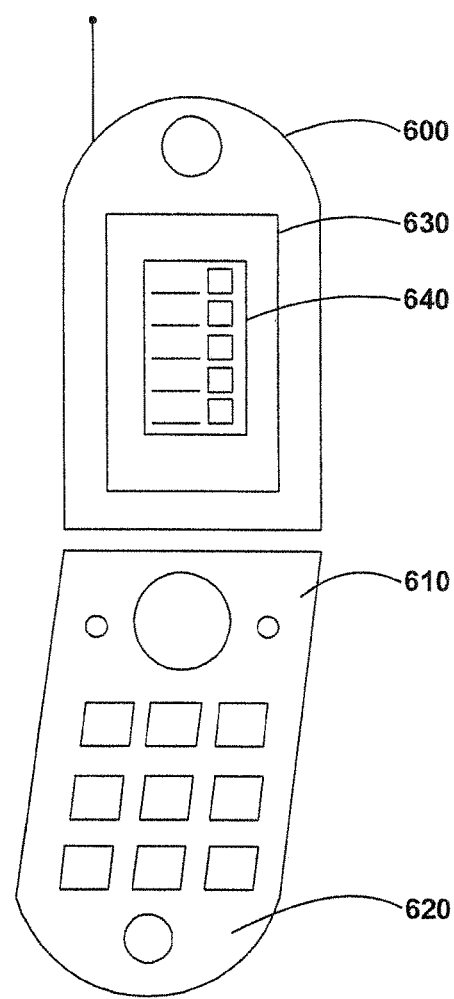
FIG. 6 diagrams an embodiment illustrating a possible user interface suitable for enabling a user to work with a Composite.

FIG. 6 diagrams an embodiment illustrating a possible user interface for a software application adapted to process a Composite. Computing platform 600, shown here as a cell phone by way of non-limiting example, contains a software application running in short-term memory 610. The software application is adapted to process a Composite. Long-term memory 620 may be a storage medium that may hold a Composite and/or a library of Composites for use with the aforementioned software application. User screen 630 may display application user interface 640. Application user interface 640 may offer such options as: Get Files; Create Composite; Send Composite; and Save Composite; to list but a few of the many possibilities.

Figure 7:
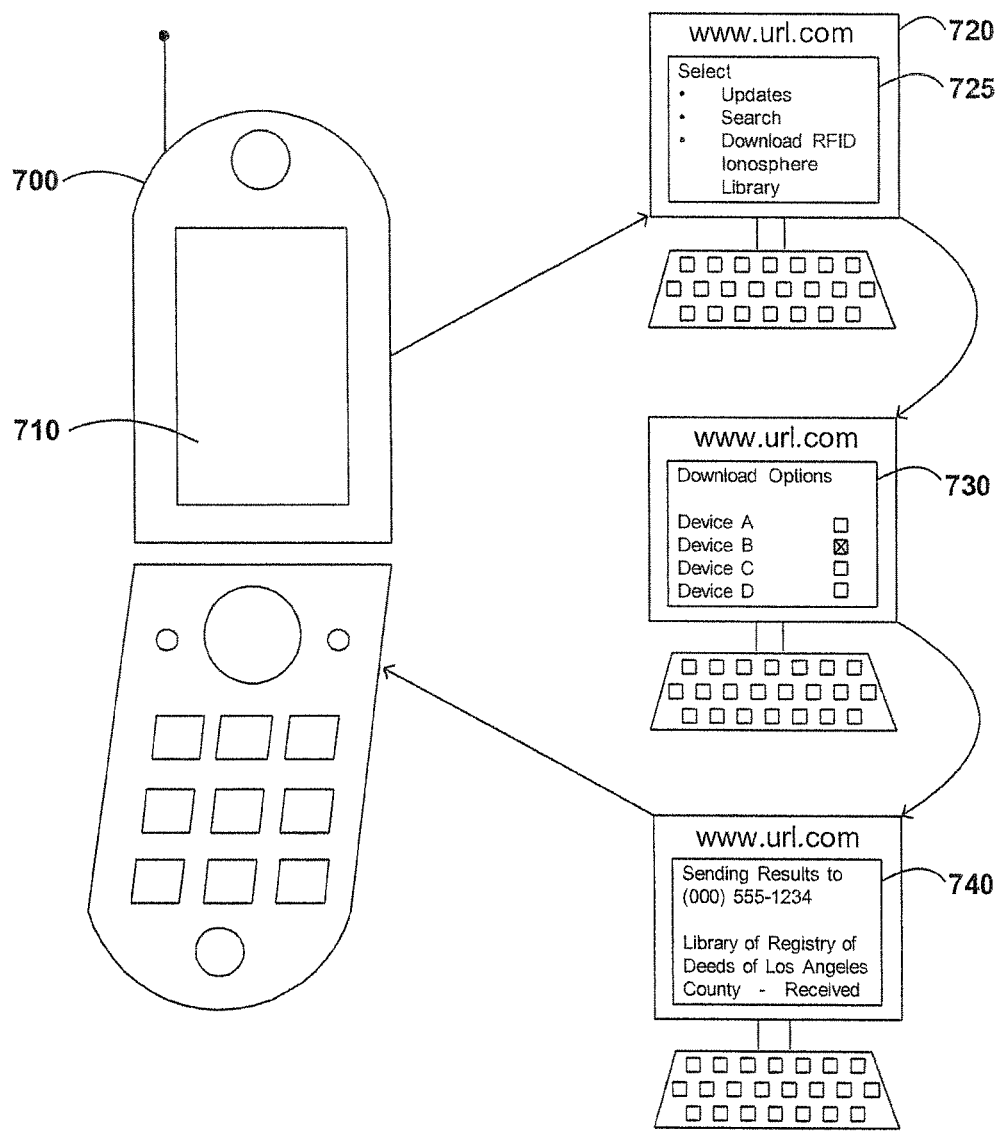
FIG. 7 is a flow diagram depicting an embodiment of a Composite in the context of a library query.

FIG. 7 is a flow diagram depicting an embodiment of a Composite in the context of a library query. Utilizing computing platform 700, shown here by way of non-limiting example as a cell phone, a user activates an appropriate user interface display 710 and logs in to a remote web site 720, here for purposes of example, a registry of deeds website. From website user interface 725 a user selects a library to download. From a subsequent website user display 730 the user selects to which type of computing platform 700 the user wishes the library sent. This same selection may similarly be made automatically by, for example, the system running the website querying computing platform 700 for its relevant characteristics. Knowing which type of device to send the library to will allow registry server 740 to send the library in a format compatible with the operating system and/or other operating characteristics of computing platform 700. Composites may then be exchanged between computing platform 700 and the registry website 720. The user then may be able to locate data and/or files within the registry utilizing Composite searches. This may include unpacking Composites at the registry and utilizing a Signature to search for information sought such as specific grantors and grantees within the registry indexes.

FIG. 8 illustrates an embodiment of a Composite utilized to initiate a purchase transaction with an electronic vendor. A user operating computing platform 810, shown here by way of non-limiting example as a cell phone, selects from user interface screen 820 an article for purchase. Selection of an item may result from user choice while reviewing a website operated by or on behalf of vendor 840. Similarly, a user may download a library of Composites relevant to the user's interests. Upon selecting an item and a vendor a user may instruct computing platform 810 to transmit a Composite to vendor 840. Vendor 840 may unpack the Composite into a data file specifying the number of units requested and a Signature specifying the particular product requested. Vendor 840 may then internally confirm the availability of the item specified by the Signature in the quantity specified by the data component of the Composite. Vendor 840 may create its own Composite and/or modify the received Composite to include a photo of the product or other designator such as a stock keeping unit ("SKU") to verify that the potential buyer and seller are thinking of the same item. Vendor 840 may additionally include within the Composite pricing and availability information before sending back a new and/or modified Composite to the user on computing platform 810. Alternatively, vendor 840 may utilize some other File type to communicate with the user on computing platform 810. User interface screen 820 then may update to display 825 the response from vendor 840.

Following user screen update 825 the user may elect to continue with the transaction or to end the transaction. Should the user signal to vendor 840 the user's intent to continue with the transaction vendor 840 may send a subsequent user screen update 830 asking the user to indicate if the user will pick up the item at a store or wishes the item delivered. The user may make this decision and then transmit not only this decision but also payment data. This data, as could any portion of this transaction, may be encrypted to limit exposing sensitive data to outsiders. Upon receipt and processing of this information, vendor 840 may transmit confirmation information either as a Composite or in some other form as may be appropriate. This confirmation message may then update the user screen 835 conveying to the user that either payment is still due or that payment has been successfully processed by vendor 840.

FIG. 9 is a block diagram of an embodiment of a purchase pick-up transaction utilizing a Composite. Here a user has previously arranged for the purchase of an item, for example a desk lamp, utilizing computing platform 810, shown here by way of non-limiting example as a personal electronic device. A user visits the store to pick up the item. At merchandise pick-up window 940 a user may send from computing platform 810 a copy, portion, and/or derivative of a Composite purchase confirmation previously received and displayed 835 on computing platform 810. Vendor Reader 930 receives the transmission and may query the vendor's database 950 for the matching transaction data. Upon locating the proper transaction the in-store register at the pick-up window may update 945 and signal computing platform 810 that final payment has already been made or is now due, and updating user display 960 to reflect such. If the user has not previously, the user may then initiate final payment by instructing computing platform 810 to send a Composite containing a secure authorization to debit the user's financial accounts of the agreed sum.

Figure 10:
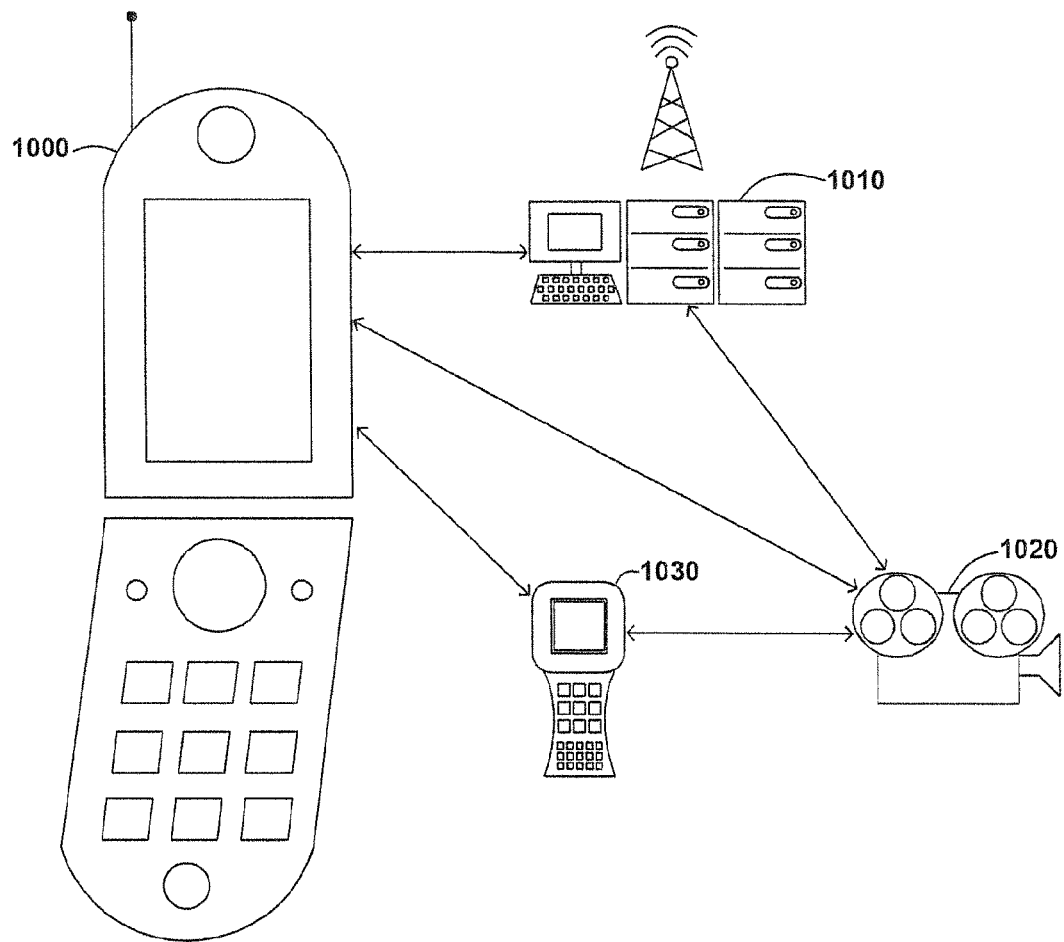
FIG. 10 is a flow diagram of an embodiment utilizing a Composite to purchase theater tickets.

FIG. 10 is a flow diagram of an embodiment utilizing a Composite to purchase theater tickets. A user utilizing computing platform 1000 initiates communication with a network operation center 1010. The computing platform may be pre-loaded with a copy of a Signature matching a movie the user wishes to attend. Alternatively, the user may utilize computing platform 1010 to procure a Signature from another source such as network operation center 1010. The user may send to network operation center 1010 a Composite containing the Signature and a data component establishing search criteria; such as for example, preferred time to attend, specific theater or area of town to attend movie, and number of tickets desired. A computer at the network operation center 1010 may then in turn interrogate a computer at movie theater 1020. Should movie theater 1020 satisfy the user's criteria it may then notify network operation center 1010 of a match. Network operation computer 1010 may in turn notify the user through computing platform 1000 of this result. Alternatively, movie theater 1020 may contact computing platform 1000 directly regarding this transaction. Should the user wish to pay for the tickets at this time the user may send a Composite containing not only any of the previous Composite components but also encrypted payment information. A Composite from movie theater 1020 confirming successful payment may also serve as an electronic ticket. Once at movie theater 1020 the user may instruct computing platform 1000 to transmit the previously received confirmation message to a Reader 1030 and either receive admission or if the user has not previously made payment make payment and then receive admission.

Figure 11:
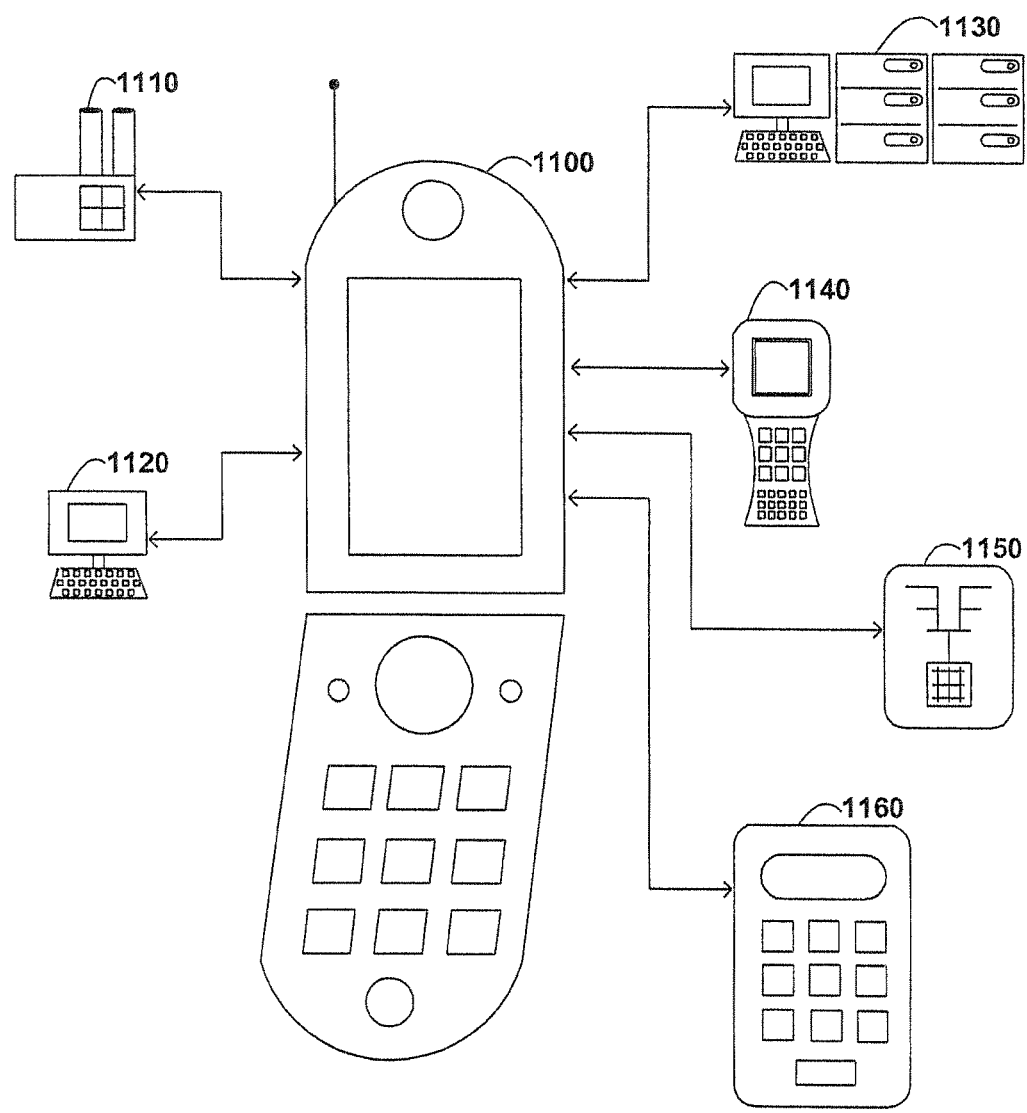
FIG. 11 is a block diagram depicting the environment and primary data paths for a computing platform utilizing a Composite.

FIG. 11 is a block diagram depicting the environment and primary data paths for a computing platform adapted to process a Composite. Computing platform 1100 may send and receive programming to and from a variety of devices in a variety of manners. The direction of the arrows in FIG. 11 depict the primary, though not the only, direction of communication. At factory 1110 computing platform 1100 may have application software installed and tested. Similarly, application software and/or updates to application software for computing platform 1100 may be installed by download across the internet, for example Once in use, a user may instruct a computing platform to exchange, that is both send to and receive from, a Composite with server 1130. Computing platform 1100 may send a Signature to a Reader. Similarly, computing platform 1100 may receive a Signature from a Reader such as when a Reader reports all tags currently within its range. Computing platform 1100 can request RFID tag signature device 1150 for its Signature and then acquire the returned Signature. Computing platform 1100 may also exchange a Composite, data, and/or a Signature with another computing platform 1160.

Figure 12:
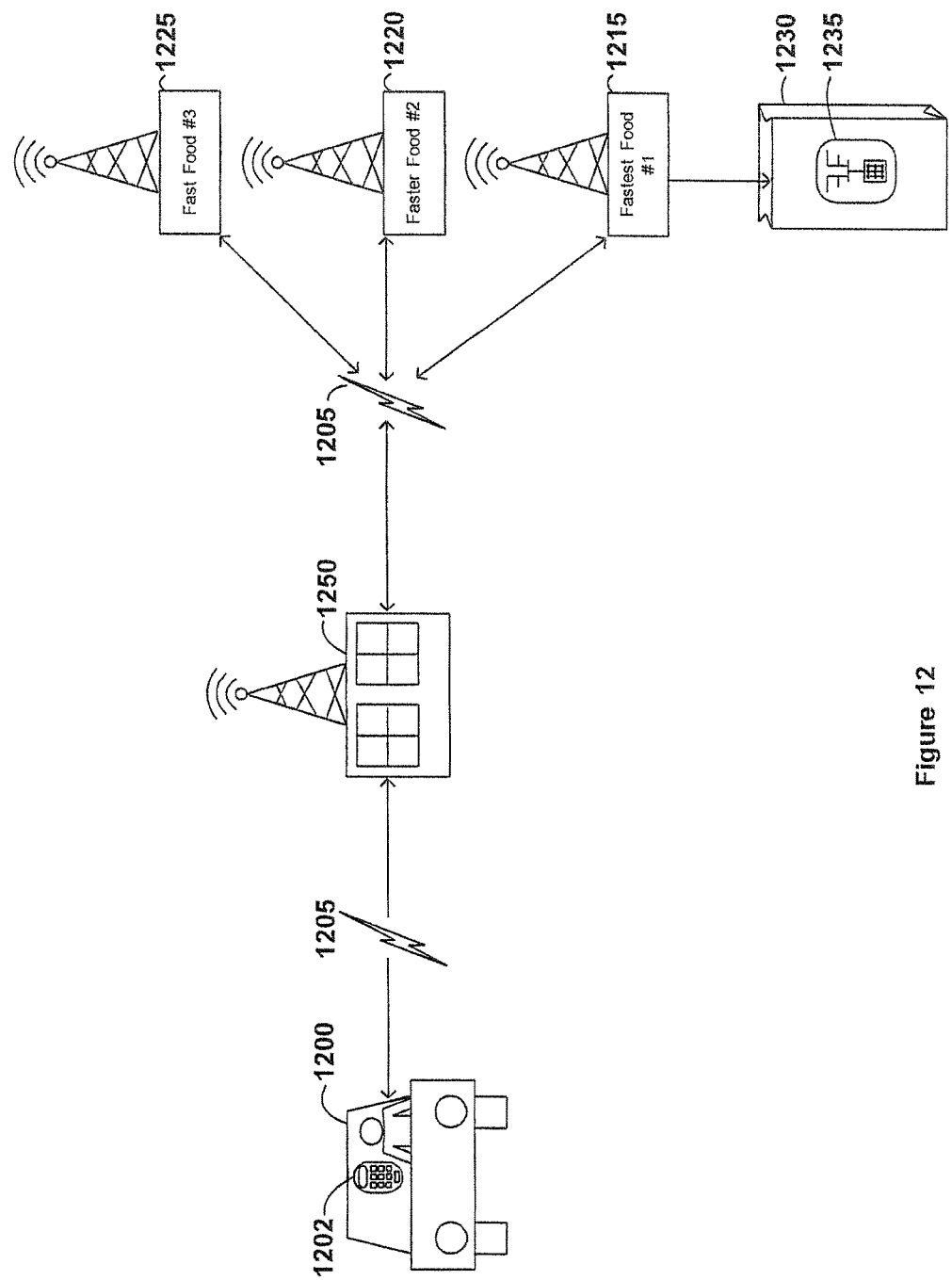
FIG. 12 is illustrative of an embodiment wherein a user utilizes a Composite to locate, order, and pick up a meal.

FIG. 12 is illustrative of an embodiment wherein a user may utilize a Composite to locate, order, and pick up a meal. This embodiment is illustrated where user 1200 is driving around and may decide to order food. User 1200 utilizes computing platform 1202, shown here by way of non-limiting example as a PDA, to send a request over user link 1205 to communications center 1250. In the request, user 1200 asks for the identity of any local fast food restaurants. Communications center 1260 responds via user link 1205 that Fast Food 1215, Faster Food 1220, and Fastest Food 1225 are nearby to user 1200. User 1200 selects Fast Food 1215 and requests a menu. In response, a computing device (not shown) at Fast Food 1215 sends to user's PDA 1202 a menu comprising a library of Composites. User 1200 opens the library and makes food selections and then communicates these selections to Fast Food 1215. Workers at Fast Food 1215 pick the selected items from inventory and place them in bag 1230. Bag 1230 may include RFID tag 1235. A worker may scan RFID tag 1235 for its Signature. A Composite is then transmitted to user's PDA 1202 including within the Composite the Signature specific to bag 1230. Upon receipt of the Composite user 1200 may or may not make payment. Arriving at Fast Food 1215 user 1200 may transmit from user PDA 1202 the Composite including the Signature associated with RFID tag 1235 thus identifying bag 1230 as containing user 1200's order. Should user 1200 not previously have made payment user 1200 may now do so. Payment may comprise transmitting an additional Composite.

Figure 13:
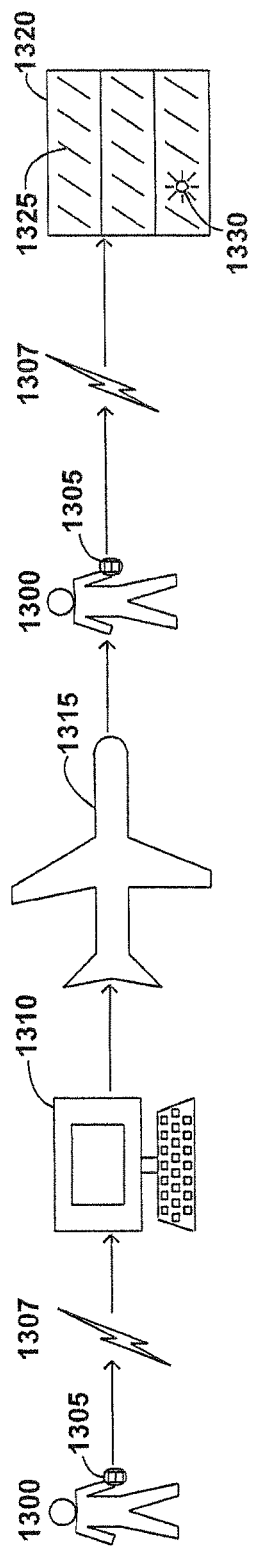
FIG. 13 illustrates a situation where a user downloads a library of Composites, travels to a remote office, and utilizes a Composite to locate a specific paper file.

FIG. 13 illustrates a situation where a user downloads a library of Composites, travels to a remote office, and utilizes a Composite to locate a specific paper file. User 1300, shown here by way of non-limiting example as an attorney, may learn that she is to travel to a remote office where she is unfamiliar with the filing system. In preparation user 1300 downloads from her home-office system 1310 to her user device 1305, shown here by way of non-limiting example as a personal electronic device (PED), a library of Composites. She then travels by plane 1315 to the remote office. She may then decide to physically locate a particular paper file stored somewhere on shelves 1320 among other files 1325. User 1300 identifies the file of interest on user device 1305 by reading a visual rendering of the data file component of a Composite. She may then cause user device 1305 to transmit the Signature associated with the selected Composite and its related paper file. Upon receipt of the Signature, Reader 1330, located within the sought after file, may blink a light and/or sound a buzzer to indicate the precise location of the file.

Figure 14:
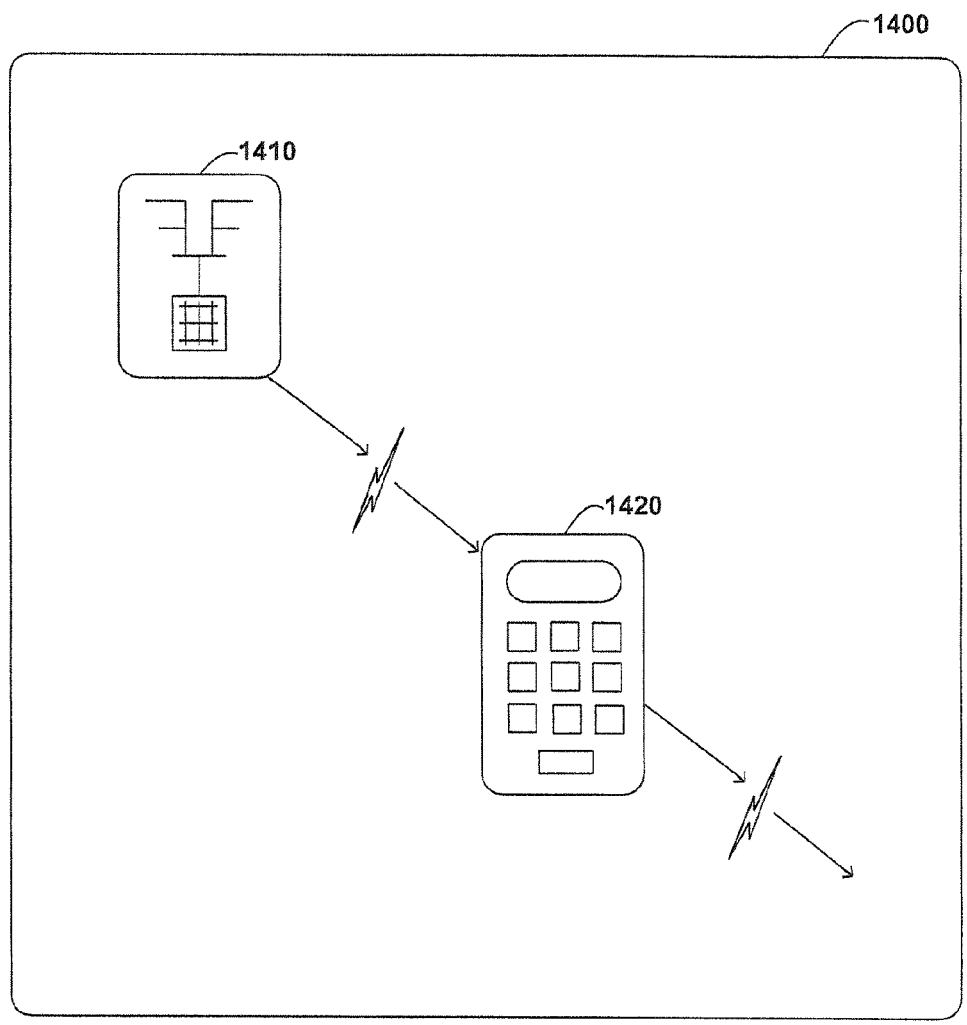
FIG. 14 depicts an embodiment of an RFID tag signature repeater system.

FIG. 14 depicts an embodiment of an RFID tag signature repeater system. System 1400 may be comprised of an RFID tag signature device 1410 and repeater device 1420 which may be a computing platform. A user, not shown, may cause repeater device 1420 to interrogate RFID tag signature device 1410 for its Signature. Repeater device 1420 may be an analog and/or digital device. Upon receipt of the Signature, repeater device 1420 may forward the Signature to another computing device for matching to a descriptor of the tagged item. Additionally, repeater device 1420 may process the Signature by, for instance, digitizing the Signature before forwarding it to a computing platform where it may be either matched as above or even forwarded again. A Signature is emitted by an RFID tag signature device in its raw, i.e. native, format. Digitizing a Signature may involve receiving a Signature in analog form and converting it into a digital signal for use in a computer by representing the original analog signal in digital form. An example of a computing device that may perform this conversion includes an analog-to-digital converter. Digitizing an RFID tag signature may not necessarily include decoding an RFID tag signature into alpha/numeric code so that it may be readable by a human. Examples of computing platforms that may serve as repeaters or be adapted to serve as repeaters include, but are not limited to, a cell phone, PDA, any manner of personal electronic and/or entertainment device (PED), and or a variety of commercial devices including, but not limited to, dedicated and multifunction electronics. A repeater may be a device that receives, amplifies, and retransmits a signal. A repeater may utilize a capture assembly to receive a signal and a play assembly to send a signal. A repeater may also store a signal. The operation of a repeater may include reshaping or retiming a received signal. Retransmitting a signal may include forwarding a signal. A repeater may amplify a signal regardless of the nature of the signal.

Capture and play assemblies may capture and/or play signals at or near a wide variety of frequency bands. These may include, but are not limited to, the ranges described below. For example, low frequency signals may be utilized at a frequency including and between 80-750 kHz such as may be employed in access and inventory control applications, for example. Intermediate frequency signals may be utilized at a frequency including and between 10-15 MHz such as may be employed in access control and smart card applications, for example. High frequency signals may be utilized at a frequency including and between 750-985 MHz and/or 1.0-9.8 GHz such as may be employed in transportation applications, for example. These frequencies are described for illustrative purposes and accordingly are not limiting.

Figure 15:
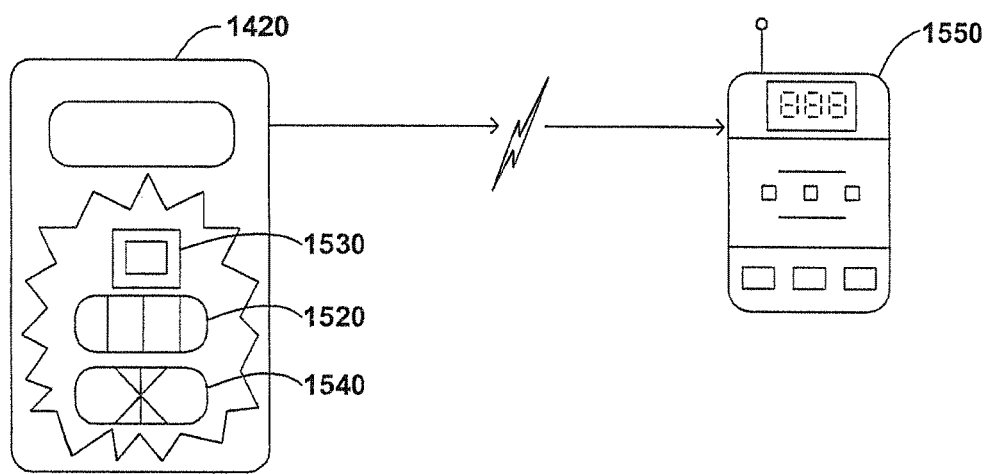
FIG. 15 depicts a repeater device coupled to a computing platform.

FIG. 15 depicts a repeater device coupled to a computing platform. One aspect of this drawing provides a cut-away view of repeater device 1420. Repeater device 1420 may comprise processor 1530, memory 1620, and digitizer 1540. Processor 1530 may comprise a microprocessor, signal processor, microcontroller, dedicated processor, custom processor, application specific processor, field programmable processor to name some, though not all, contemplated devices and accordingly is not limited in these respects. Memory 1520 may be a storage medium comprised of long and/or short term memory either in the form of integrated computer circuits such as RAM or EEPROM for example and/or storage device of another configuration such as a disk drive for example. Digitizer 1540 may provide the functionality described above in the discussion of digitizing a Signature. Repeater device 1420 may communicate with computing platform 1550 for example via wireless, wired, or contact based communication. Wireless communication may include such through-the-air communications as may be commonly utilized in WiFi, cellular, other broadcast techniques, and technologies. Wired communications may be effectuated, by way of non-limiting example, via twisted pair, Ethernet, copper cable, and/or fiber optic cable. Contact based communication may include where a repeater is swiped through a Reader as commonly performed with a credit card, and/or brought in to contact with a computing device such as for example by being placed into a cradle. Computing platform 1550 may comprise a server, router, and/or a virtual machine such as that which may support a distributed database for example.

Figure 16:
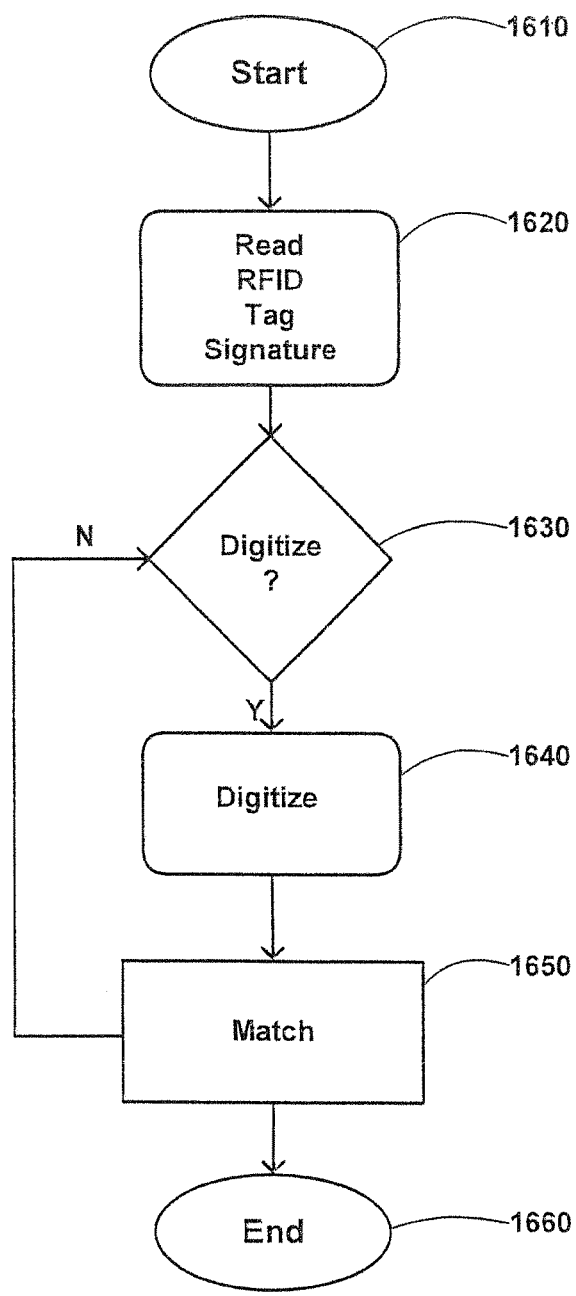
FIG. 16 is a flow diagram illustrating a method of identifying an RFID tagged item without decoding a Signature.
Figure 8E:
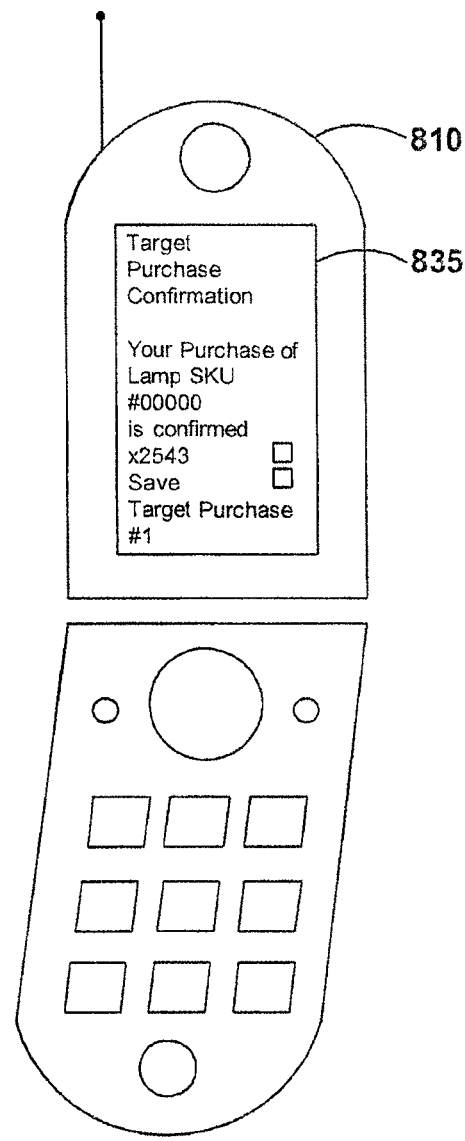

FIG. 16 is a flow diagram illustrating a method of identifying an RFID tagged item without decoding a Signature. The method 1600 is illustrated as a series of operations and selections which may or may not be performed in the order indicated and/or some may not even be performed at all. The method begins at start 1610. First, the method may perform a read of Signature 1620. Following this, a decision whether or not to digitize 1630 the Signature may be made. A "yes" decision may cause the signal be sent to digitize 1640. In contrast, a "no" decision" may bypass digitize 1640. At match 1650 the Signature may then be matched to a descriptor relevant to the RFID tag signature device of interest. Following this the method is completed and comes to end 1660.

In the preceding description, various aspects of claimed subject matter have been described. For purposes of explanation, systems and configurations were set forth to provide a thorough understanding of claimed subject matter. However, these are merely example illustrations of the above concepts wherein other illustrations may apply as well, and the scope of the claimed subject matter is not limited in these respects. It should be apparent to one skilled in the art having the benefit of this disclosure that claimed subject matter may be practiced without the specific details. In other instances, well-

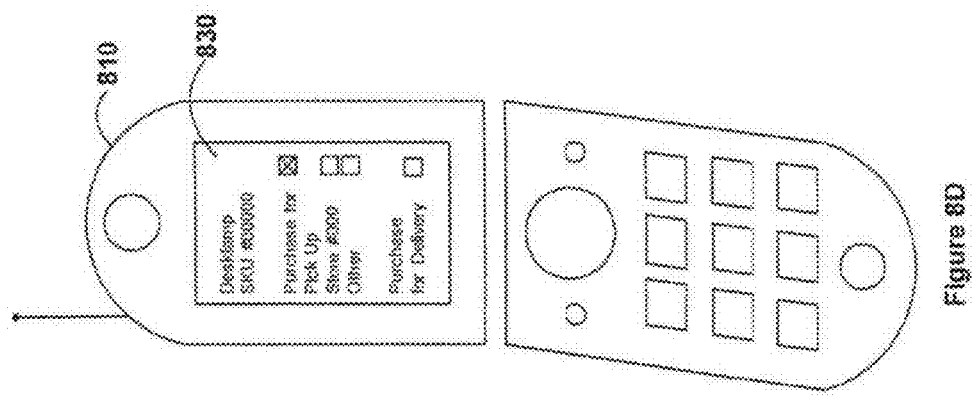
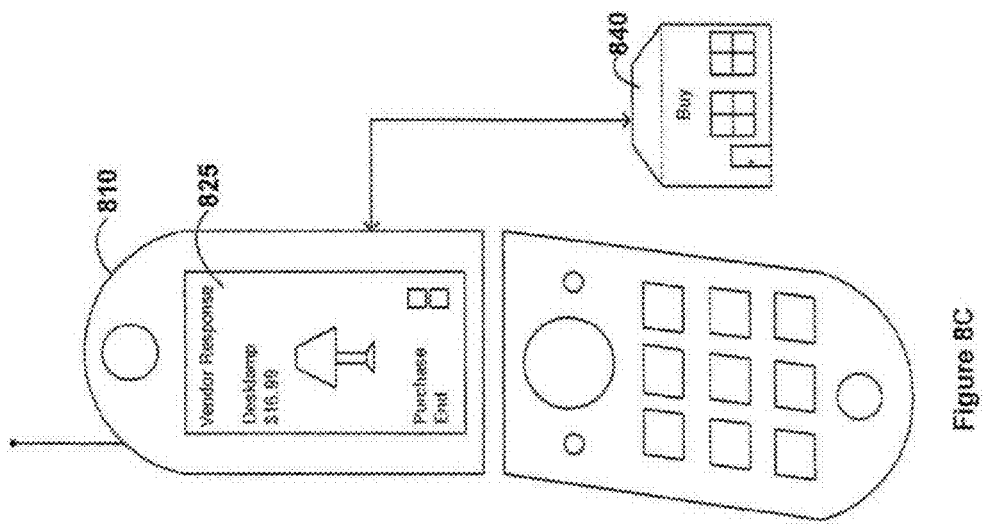

The invention claimed is:

1. A computer-readable memory device having instructions stored thereon that, in response to execution by a mobile device, cause the mobile device to perform operations comprising:
   querying a purchase transaction device to request a radio frequency identification (RFID) number associated with a purchase item;
   comparing the RFID number with a library of items associated with a plurality of RFID numbers to identify a description of the purchase item;
   combining the RFID number together with the description to form a composite file;
   querying the purchase transaction device with at least a portion of the composite file to determine an availability of the purchase item; and
   transmitting the composite file from the mobile device to the purchase transaction device to request the purchase item.

2. The computer-readable memory device of claim 1, wherein the operations further comprise receiving the RFID number from the purchase transaction device prior to transmitting the composite file.

3. The computer-readable memory device of claim 1, wherein the operations further comprise receiving, at the mobile device, the library of items, wherein the library of items comprises descriptions of the items, and wherein each of the items is associated with a unique RFID number.

4. The computer-readable memory device according to claim 1, wherein the operations further comprise operating on the composite file with a codec before transmitting the composite file to the purchase transaction device.

5. The computer-readable memory device according to claim 1, wherein the composite file comprises an order to purchase the purchase item.

6. The computer-readable memory device of claim 1, wherein the RFID number is stored at a supplier database associated with the purchase transaction device.

7. The computer-readable memory device of claim 6, wherein the RFID number identifies the purchase item from the supplier database.

8. A method, comprising:
   querying, by a mobile device, a purchase transaction device to request a radio frequency identification (RFID) signature associated with a purchase item;
   comparing, by the mobile device, the RFID signature with a library of items associated with a plurality of RFID signatures;
   identifying, by the mobile device, a description of the purchase item based, at least in part, on said comparing;
   combining, by the mobile device, the RFID signature together with the description to form a composite file;
   querying, by the mobile device, the purchase transaction device with at least a portion of the composite file to determine an availability of the purchase item; and
   transmitting, by the mobile device, the composite file from the mobile device to the purchase transaction device to request the purchase item.

9. The method of claim 8, wherein the operations further comprise receiving, at the mobile device, the library of items, wherein the library of items comprises descriptions of the items, and wherein each of the items is associated with a unique RFID signature.

10. The method of claim 9, wherein the library of items comprises a menu, wherein the composite file includes a request to order the purchase item from the menu, and wherein the method further comprises:
    receiving, by the mobile device, a confirmation of the order; and
    displaying, by the mobile device, the confirmation in exchange for obtaining the purchase item.

11. The method of claim 8, wherein the RFID signature is stored at a supplier database associated with the purchase transaction device.

12. The method of claim 8, wherein the RFID signature identifies the purchase item from a supplier database.

13. The method of claim 8, wherein querying the purchase transaction device comprises requesting the RFID signature prior to transmitting the composite file.

14. An apparatus comprising:
    means for querying a purchase transaction device to request a radio frequency identification (RFID) number associated with a purchase item;
    means for comparing the RFID number against a library of items available for purchase to identify a description of the purchase item, wherein the library of items comprises descriptions of the items, and wherein each of the items is associated with a unique RFID number;
    means for combining the RFID number together with the description to form a composite file, wherein the purchase transaction device is further queried with at least a portion of the composite file to determine an availability of the purchase item; and
    means for transmitting the composite file from a mobile device to the purchase transaction device to request the purchase item.

15. The apparatus of claim 14, wherein the composite file identifies a number of purchase items being requested.

16. The apparatus of claim 14, further comprising means for receiving a second composite file on the mobile device, including a verification of the purchase item, in response to transmitting the composite file.

17. The apparatus of claim 14, further comprising means for receiving a response on the mobile device indicating that the request was received by a vendor of the purchase item, wherein the response comprises the composite file and a confirmation of receipt of the request.

18. The apparatus of claim 14, wherein the RFID number is stored at a supplier database associated with the purchase transaction device.

19. The apparatus of claim 18, wherein the RFID number identifies the purchase item from the supplier database.

20. The apparatus of claim 14, wherein the purchase transaction device is queried prior to transmitting the composite file.

* * * * *

UNITED STATES PATENT AND TRADEMARK OFFICE
CERTIFICATE OF CORRECTION

PATENT NO. : 8,604,928 B2
APPLICATION NO. : 13/527410
DATED : December 10, 2013
INVENTOR(S) : Fein et al.

It is certified that error appears in the above-identified patent and that said Letters Patent is hereby corrected as shown below:

On the Title Page

Delete item "(60)" and insert item -- (62) --, therefor.

In the Drawings

Figure 8B:
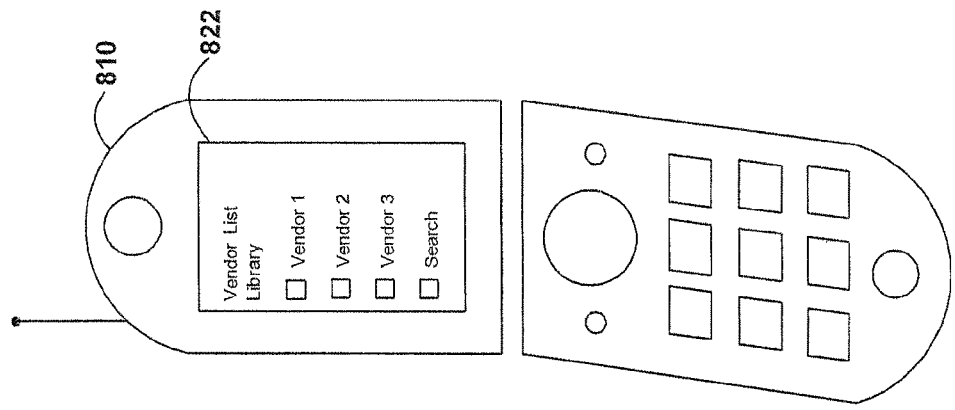
FIG. 8 illustrates an embodiment detailing a user utilizing a Composite to initiate a purchase transaction with a vendor.
Figure 8A:
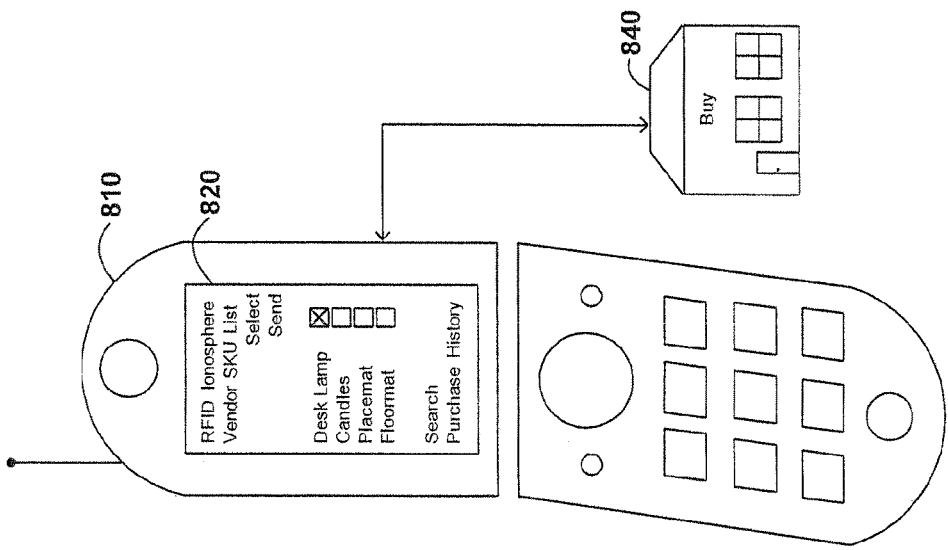
Figure 8D:
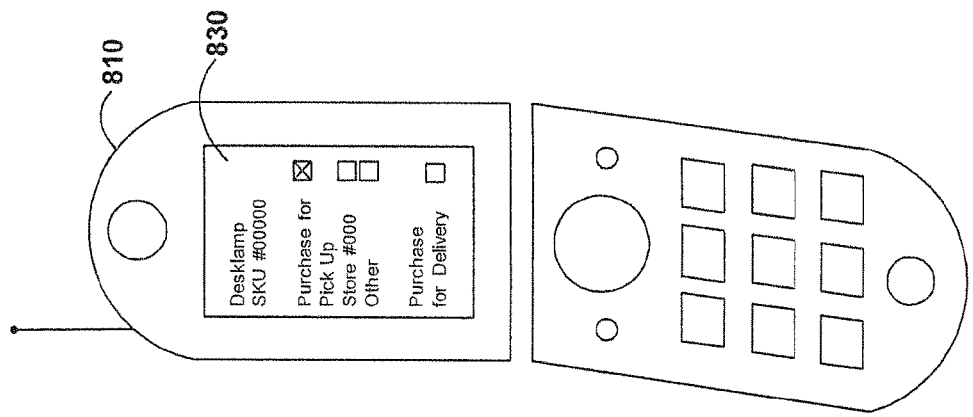
Figure 8C:
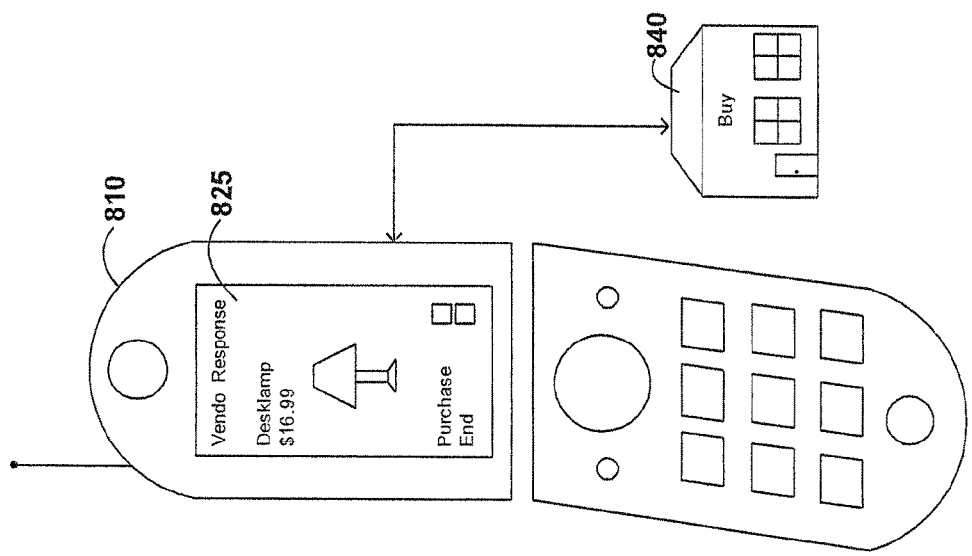

In Fig. 8C, Sheet 9 of 18, for Tag "825", in Line 1, delete "Vendo" and insert -- Vendor --, therefor. (See attached Sheet)

Figure 8E:
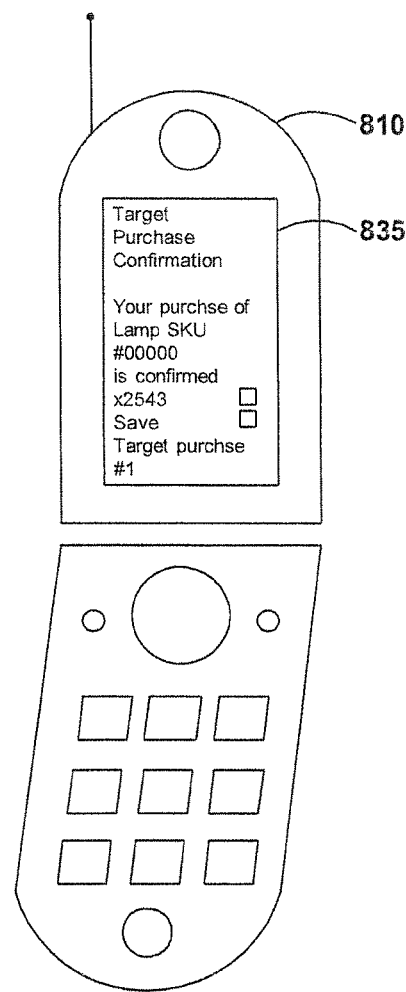

In Fig. 8E, Sheet 10 of 18, for Tag "835", in Line 4, delete "Your purchse" and insert -- Your purchase --, therefor. (See attached Sheet)

In Fig. 8E, Sheet 10 of 18, for Tag "835", in Line 10, delete "Target purchse" and insert -- Target purchase --, therefor.

Figures 9A, 9B:
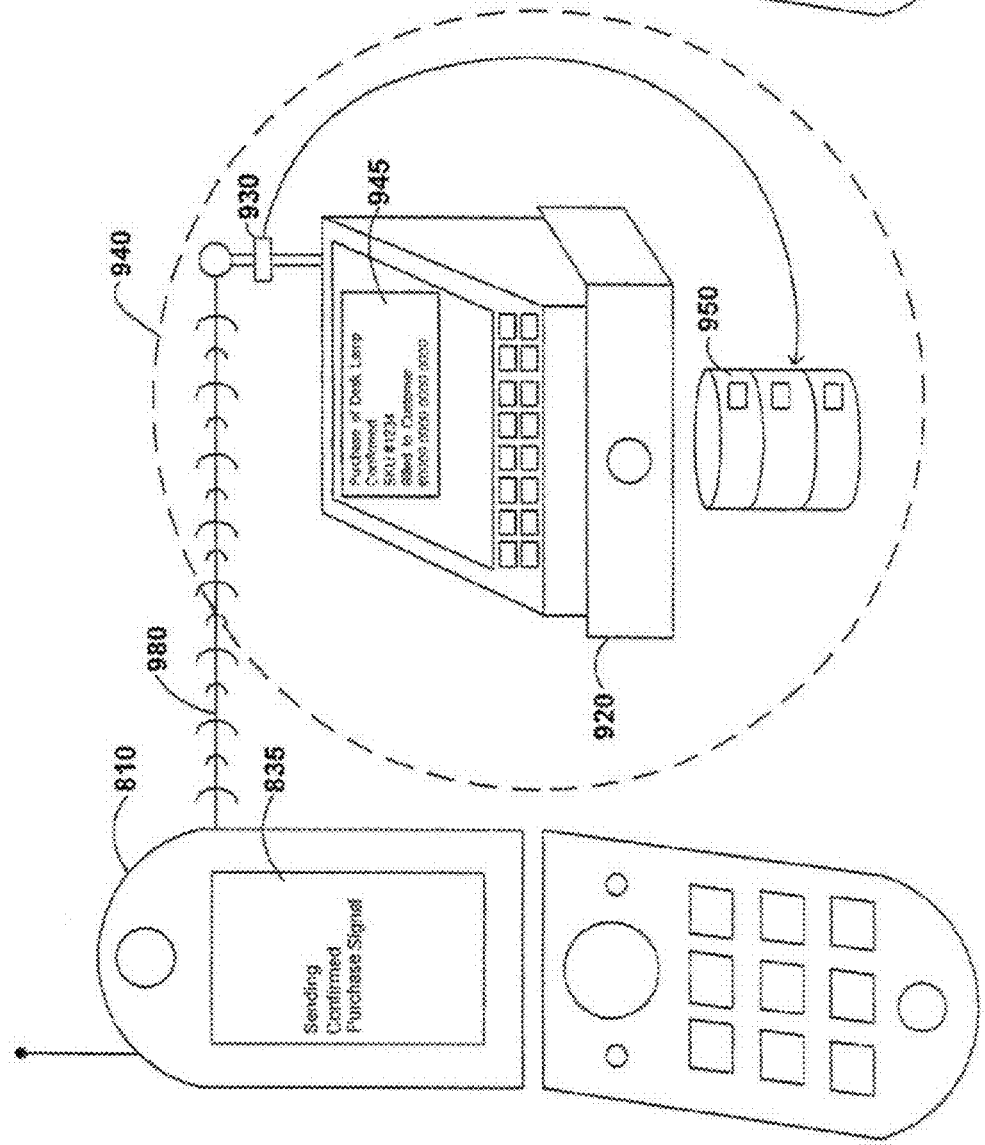
FIG. 9 is a block diagram of an embodiment of a purchase pick-up transaction utilizing a Composite.
Figure 12:
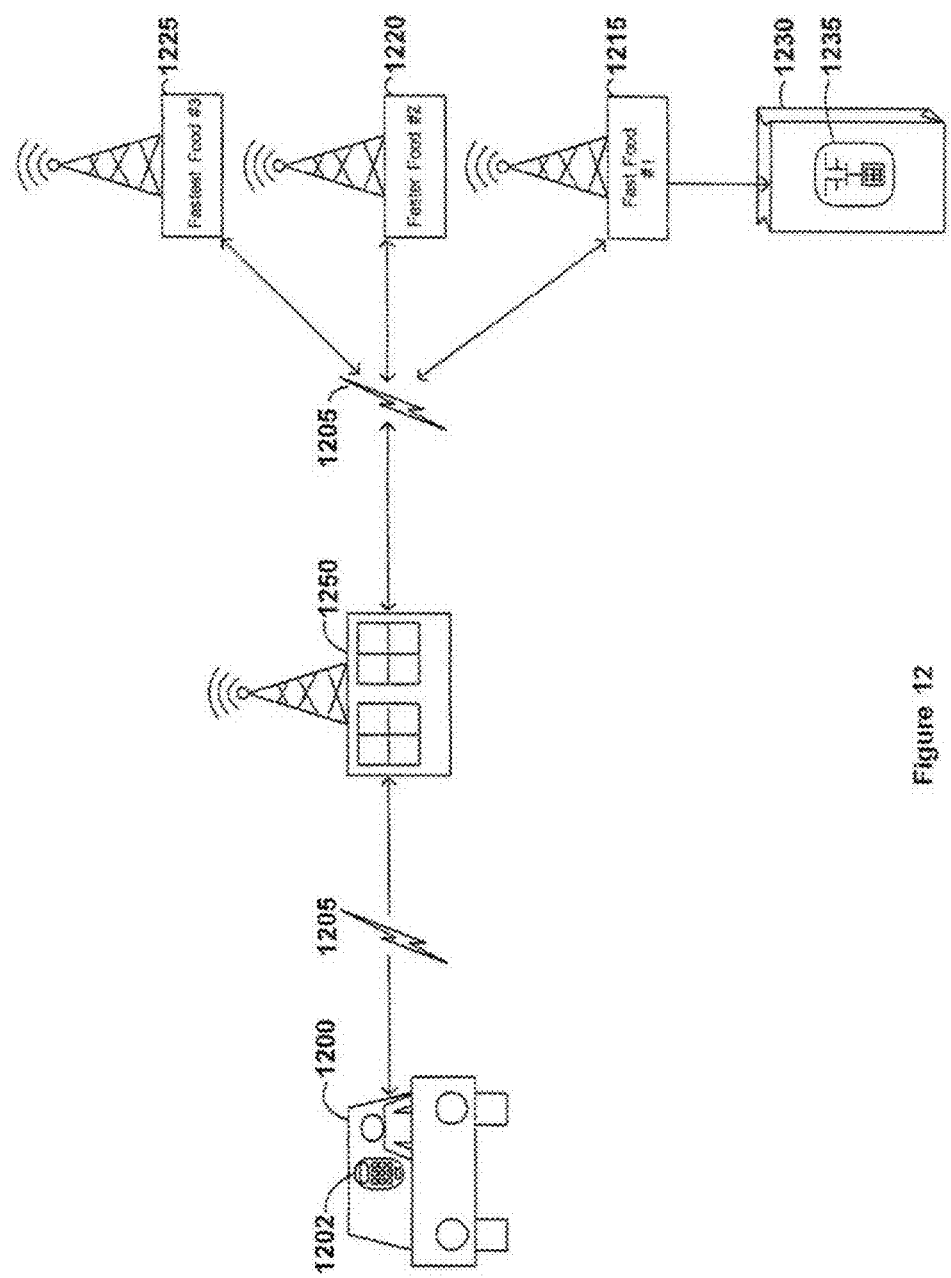

In Fig. 9A, Sheet 11 of 18, for Tag "835", in Line 3, delete "Purchse" and insert -- Purchase --, therefor. (See attached Sheet)

In Fig. 12, Sheet 14 of 18, for Tag "1225", in Line 1, delete "Fast" and insert -- Fastest --, therefor. (See attached Sheet)

In Fig. 12, Sheet 14 of 18, for Tag "1215", in Line 1, delete "Fastest" and insert -- Fast --, therefor.

In the Specification

In Column 1, Line 44, delete "is block" and insert -- is a block --, therefor.

In Column 6, Lines 8-9, delete "computing platform 1010" and insert -- computing platform 1000 --, therefor.

Signed and Sealed this
Twenty-fourth Day of April, 2018

Andrei Iancu
*Director of the United States Patent and Trademark Office*

In Column 6, Line 42, delete "example Once" and insert -- example, once --, therefor.

In Column 8, Line 18, delete "1620," and insert -- 1520, --, therefor.